(12) United States Patent
Beck et al.

(10) Patent No.: US 12,467,507 B2
(45) Date of Patent: Nov. 11, 2025

(54) HOLLOW-SHAFT ASSEMBLY FOR A MOTOR VEHICLE

(71) Applicant: Bayerische Motoren Werke Aktiengesellschaft, Munich (DE)

(72) Inventors: Florian Beck, Freising (DE); Sebastian Markert, Hilgertshausen-Tandern (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 474 days.

(21) Appl. No.: 17/919,104

(22) PCT Filed: Apr. 21, 2021

(86) PCT No.: PCT/EP2021/060357
§ 371 (c)(1),
(2) Date: Oct. 14, 2022

(87) PCT Pub. No.: WO2021/233632
PCT Pub. Date: Nov. 25, 2021

(65) Prior Publication Data
US 2023/0167857 A1 Jun. 1, 2023

(30) Foreign Application Priority Data
May 19, 2020 (DE) .................. 10 2020 113 592.0

(51) Int. Cl.
*F16D 1/10* (2006.01)
(52) U.S. Cl.
CPC ........ *F16D 1/101* (2013.01); *F16D 2001/103* (2013.01); *F16D 2300/06* (2013.01)
(58) Field of Classification Search
CPC ............... F16D 1/101; F16D 2001/103; F16D 2300/06; F16N 7/18; F16N 7/36;
(Continued)

(56) References Cited

U.S. PATENT DOCUMENTS

| | | | | |
|---|---|---|---|---|
| 1,541,007 A | * | 6/1925 | Thiemer | ................... F16D 3/06 403/359.5 |
| 3,234,758 A | * | 2/1966 | Lewis | ....................... F16D 3/06 464/16 |

(Continued)

FOREIGN PATENT DOCUMENTS

| | | |
|---|---|---|
| CN | 108204445 A | 6/2018 |
| DE | 10 2017 210 573 A1 | 12/2018 |

(Continued)

OTHER PUBLICATIONS

International Search Report (PCT/ISA/210) issued in PCT Application No. PCT/EP2021/060357 dated Jul. 28, 2021 with English translation (five (5) pages).
(Continued)

*Primary Examiner* — Josh Skroupa
(74) *Attorney, Agent, or Firm* — Crowell & Moring LLP

(57) ABSTRACT

A hollow-shaft arrangement for a motor vehicle includes an inner hollow shaft and an outer hollow shaft. An inner shaft shoulder of the outer hollow shaft is arranged behind the inner toothing in an axial direction as viewed from the inflow end of the inner hollow shaft, the inner diameter ($D_1$) of which shaft shoulder is smaller than a root-circle diameter ($D_2$) of the inner toothing, so that, when the hollow shafts rotate, the fluid exiting from the outflow end of the inner hollow shaft at least partially is backed up by the shaft shoulder in a tooth root region of the inner toothing and flows back in the direction of the inflow end of the inner hollow shaft within the splice toothing.

9 Claims, 3 Drawing Sheets

(58) Field of Classification Search
CPC .......... F16N 7/363; F16N 2210/04; Y10T 403/7026; Y10T 403/7028; Y10T 403/7031; Y10T 403/7032; Y10T 403/7033; Y10T 403/7035
USPC ......... 403/359.1, 359.2, 359.3, 359.4, 359.5, 403/359.6; 464/7, 16
See application file for complete search history.

(56) References Cited

U.S. PATENT DOCUMENTS

| | | | |
|---|---|---|---|
| 4,341,296 A | | 7/1982 | Schaefer et al. |
| 4,552,544 A | * | 11/1985 | Beckman .......... F16D 3/06 403/359.6 |
| 5,687,612 A | | 11/1997 | Mura |
| 6,098,753 A | * | 8/2000 | Lamarre .......... F01D 25/183 184/6.11 |
| 8,678,937 B2 | * | 3/2014 | Humes .......... F16D 1/10 464/7 |
| 10,443,657 B2 | | 10/2019 | Nakawatari et al. |
| 11,279,220 B2 | * | 3/2022 | Hagihara .......... F16D 1/101 |
| 2011/0129291 A1 | | 6/2011 | Humes |
| 2015/0225054 A1 | | 8/2015 | Nakamura et al. |
| 2017/0114835 A1 | * | 4/2017 | Ottow .......... F16D 1/10 |
| 2019/0309797 A1 | * | 10/2019 | Nicoletti .......... F16D 1/10 |

FOREIGN PATENT DOCUMENTS

| | | |
|---|---|---|
| DE | 10 2018 211 359 A1 | 1/2020 |
| EP | 3 159 511 A1 | 4/2017 |
| GB | 2572585 A | 10/2019 |
| JP | 4-277359 A | 10/1992 |
| JP | 2003-90351 A | 3/2003 |
| JP | 2017-75627 A | 4/2017 |
| WO | WO 2007/013225 A1 | 2/2007 |

OTHER PUBLICATIONS

German-language Written Opinion (PCT/ISA/237) issued in PCT Application No. PCT/EP2021/060357 dated Jul. 28, 2021 (five (5) pages).

German-language Search Report issued in German Application No. 10 2020 113 592.0 dated Jan. 4, 2021 with partial English translation (11 pages).

Chinese-language Office Action issued in Chinese Application No. 202180022597.8 dated Jan. 27, 2024 with English translation (16 pages).

* cited by examiner

HOLLOW-SHAFT ASSEMBLY FOR A MOTOR VEHICLE

BACKGROUND

The present disclosure relates to a hollow-shaft arrangement for a motor vehicle of the type specified in the preamble of claim 1. The disclosure furthermore relates to a motor vehicle having at least one such hollow-shaft arrangement.

Hollow shafts are installed in motor vehicles such that, in the interior of such hollow shafts, a fluid, for example a coolant and/or lubricant, can flow and exit through radial passage openings. A fluid guide of this type in hollow shafts may be used for cooling of surrounding components and/or for lubrication of surrounding components in the region of such hollow shafts. According to boundary conditions, it is also sometimes the case that two hollow shafts are connected to one another via a spline toothing, wherein a coolant flow and/or lubricant flow can flow through both hollow shafts.

DE 10 2018 211 359 A1, for example, presents a hollow-shaft arrangement of said type for a motor vehicle. The hollow-shaft arrangement presented there comprises an inner hollow shaft in the form of a transmission input shaft and an outer hollow shaft in the form of a rotor shaft, wherein the two hollow shafts are connected to one another by means of a spline toothing in that an outer toothing of the inner hollow shaft engages with an inner toothing of the outer hollow shaft in a rotationally conjoint manner. In the interior of the outer hollow shaft in the form of a rotor shaft, there extends an oil lance by means of which oil can be introduced into the interior of the outer hollow shaft. The oil introduced in this way flows from the outer hollow shaft in the direction of the inner hollow shaft, wherein an axial flow groove is provided between the outer hollow shaft and the inner hollow shaft so that the oil can reach inter alia also the spline toothing of the two hollow shafts.

SUMMARY

It is one object of the disclosure to provide a solution by means of which two hollow shafts connected to one another via a spline toothing can be supplied with a lubricant in the region of their spline toothing.

This and other objects are achieved by a hollow-shaft arrangement for a motor vehicle disclosed herein. The hollow-shaft arrangement according to the disclosure for a motor vehicle comprises an inner hollow shaft and an outer hollow shaft, which are connected to one another by means of a spline toothing, wherein an outer toothing of the inner hollow shaft engages with an inner toothing of the outer hollow shaft in a rotationally conjoint manner. The term "inner" is to be understood as meaning that the inner hollow shaft is arranged within the outer hollow shaft in the region of the spline toothing. The term "outer" is to be understood in a corresponding manner in the case of the outer hollow shaft. In particular, the inner hollow shaft is inserted not fully but only partly in the outer hollow shaft, specifically inter alia in the region of the spline toothing. The inner hollow shaft has an inflow end for feeding of a fluid into the interior of the inner hollow shaft and has an outflow end, wherein the outflow end opens out, within the inner toothing of the outer hollow shaft, into the latter. The fluid may be in particular a coolant and/or lubricant, for example in the form of an oil or the like.

An inner shaft shoulder of the outer hollow shaft is arranged behind the inner toothing of the outer hollow shaft in an axial direction as viewed from the inflow end of the inner hollow shaft. An inner diameter of said inner shaft shoulder of the outer hollow shaft is smaller than a root-circle diameter of the inner toothing of the outer hollow shaft. In other words, the inner shaft shoulder is a type of collar of the outer hollow shaft that projects radially inward beyond the root circle of the inner toothing of the outer hollow shaft. If the shaft shoulder is viewed in the axial direction through the outer hollow shaft on a side of the shaft shoulder that faces away from the spline toothing, then said shaft shoulder at least partially conceals the spline toothing.

Due to this inner shaft shoulder, formed in this way, of the outer hollow shaft, which adjoins the inner toothing of the outer hollow shaft, when the hollow shafts rotate, the fluid flowing out of the outflow end of the inner hollow shaft at least partially is backed up by the shaft shoulder in a tooth root region of the inner toothing and flows back in the direction of the inflow end of the inner hollow shaft within the splice toothing. Through the provision of the inner shaft shoulder of the outer hollow shaft, it is thus the case that a centrifugal-force-driven counterflow supply of the axial spline toothing with the fluid is realized.

The fluid fed in the region of the inflow end of the inner hollow shaft thus flows through the interior of the inner hollow shaft, and then exits at the outflow end of the hollow shaft and consequently flows into the interior of the outer hollow shaft. Due to centrifugal-force-action, since the two hollow shafts rotate during intended operation, at least a part of the exiting fluid passes radially outward and thus comes into contact with the inner toothing of the outer hollow shaft that is not in engagement with the outer toothing of the inner hollow shaft, since the inner toothing of the outer hollow shaft axially projects beyond the outer toothing of the inner hollow shaft.

The fact that the inner diameter of the shaft shoulder is smaller than a root-circle diameter of the inner toothing means that the fluid is backed up in the tooth foot region of the inner toothing of the outer hollow shaft and, consequently, can lubricate the toothings of the spline toothing in a reactive manner. The fluid backed up by the shaft shoulder in the form of a collar thus flows, in relation to a main flow direction, as seen within the inner hollow shaft, oppositely through the spline toothing and consequently lubricates the latter. It is thus possible for the occurrence of frictional corrosion within the spline toothing to be reliably prevented, it otherwise being possible for said frictional corrosion to occur without sufficient lubrication and owing to micromovements between the inner toothing and the outer toothing that occur. As soon as the fluid has been backed up beyond the radial height of the shaft shoulder by the shaft shoulder, further inflowing fluid flows over the shaft shoulder and, in this way, passes into the interior of the outer hollow shaft.

A possible configuration of the disclosure provides that the inner toothing of the outer hollow shaft axially projects beyond the outer toothing of the inner hollow shaft to such an extent in the direction of the shaft shoulder that, when the hollow shafts rotate, at least a part of the fluid exiting from the outflow end of the inner hollow shaft passes, due to centrifugal-force action, to the inner toothing of the outer hollow shaft that is not in engagement with the outer toothing. Thus, as viewed in the axial direction, the inner toothing of the outer hollow shaft is designed to be longer than would be necessary for the actual realization of the spline toothing. Here, that part of the inner toothing which is not in engagement with the outer toothing of the inner hollow shaft is designed to be of such a length that, in a manner matching the normal rotational speed of the hollow shafts and of the fluid used and the fluid quantity used, it can be ensured that the fluid exiting from the outflow end of the inner hollow shaft into the interior of the outer hollow shaft has, due to centrifugal-force action, enough space in the axial direction so that the fluid, due to centrifugal-force action, can reach the inner toothing of the outer hollow shaft. Then, the inner shaft shoulder, in the form of a collar, of the outer hollow shaft in turn makes provision for the fluid to be backed up in the tooth root region of the inner toothing, and to flow back within the spline toothing and to consequently lubricate the latter.

A further possible configuration of the disclosure provides that, behind the spline toothing as viewed from the shaft shoulder, the outer hollow shaft has at least one radially extending passage opening through which that portion of the fluid which flows back through the spline toothing can exit the outer hollow shaft. After the flow reversal of the fluid and flow through the spline toothing, the fluid or that part of the fluid which has passed through the spline toothing can exit radially outward through said passage opening of the outer hollow shaft. On the one hand, it can be consequently ensured that a counterpressure within the fluid of such a magnitude that the flowing-back of the fluid through the spline toothing would be impeded is not built up. On the other hand, that part of the fluid which has already passed the spline toothing for the purpose of lubricating the spline toothing can also be used for lubricating and/or for cooling components situated outside the hollow shaft.

In a further possible configuration of the disclosure, it is provided that the inner hollow shaft has at least one radially extending passage opening through which a part of the fluid fed through the inflow end can exit the inner hollow shaft. A part of the fluid that flows through the inner hollow shaft can therefore exit radially outward through the at least one radially extending passage opening, in order in this way to lubricate and/or to cool components situated outside the inner hollow shaft.

According to a further possible configuration of the disclosure, it is provided that the passage openings of the hollow shafts are connected to one another via an intermediate space formed between the hollow shafts. That part of the fluid which exits radially outward from the interior of the hollow shaft thus firstly passes into said intermediate space, from where the fluid accumulated therein can exit radially outward through the passage opening of the outer hollow shaft. Thus, in said intermediate space, there flow together respective fluid flows: specifically, the fluid flow branched directly off from the interior of the hollow shaft, on the one hand, and that part of the fluid flow which has firstly been backed up by the shaft shoulder and consequently flowed, directed in reverse, through the spline toothing, on the other hand.

A further possible configuration of the disclosure provides that a fluid feed arranged in the region of the inflow end of the inner hollow shaft introduces the fluid obliquely to the longitudinal direction of the inner hollow shaft. In this way, it can be ensured that the fluid introduced flows radially outward in the interior of the inner hollow shaft, and thereby hugs an inner wall of the inner hollow shaft, as quickly as possible. The fact that the fluid flows along said inner wall of the inner hollow shaft means that it can exit radially outward through one or else multiple passage openings of the inner hollow shaft in a particularly simple manner. Moreover, the ability of the fluid to be directed particularly quickly and over axially short distances radially outward in the direction of the inner toothing of the outer hollow shaft, where the fluid, in a manner already described, is backed up by the inner shaft shoulder of the outer hollow shaft and directed back in the direction of the spline toothing, at the outflow end of the inner hollow shaft is consequently promoted.

In a further possible configuration of the disclosure, it is provided that the fluid feed has at least one nozzle which is oriented obliquely to the longitudinal direction of the inner hollow shaft. By way of the nozzle, it is possible in a particularly simple and reliable manner for the fluid to be directed in the direction of said inner wall of the inner hollow shaft in the region of the inflow end.

A further possible configuration of the disclosure provides that the inner hollow shaft is a transmission input shaft, and the outer hollow shaft is a rotor shaft of an electric drive machine. Thus, in this case, the fluid firstly flows in an axial direction through the transmission input shaft, it being possible for some of said fluid to exit the transmission input shaft in a radial direction through provided radial passage openings, wherein the remaining fluid passes into the rotor shaft of the electric drive machine and, in the manner already described, is at least partially backed up by said shaft shoulder in such a way that at least a part of the fluid flow does not pass into the interior of the rotor shaft and instead is reversed, or directed back, in such a way that at least a part of the fluid flows through the spline toothing and consequently lubricates the latter. In principle, it is possible for the hollow-shaft arrangement to also be provided for a wide variety of other application areas in a motor vehicle, specifically wherever two hollow shafts are connected to one another in a rotationally conjoint manner via a spline toothing and the spline toothing is to be lubricated.

The motor vehicle according to the disclosure comprises at least one hollow-shaft arrangement according to the disclosure or one possible configuration of the hollow-shaft arrangement according to the disclosure.

Further features of the disclosure may emerge from the claims, from the figures and from the description of the figures. The features and feature combinations mentioned above in the description, and the features and feature combinations shown below in the description of the figures and/or only in the figures, may be used not only in the respectively specified combination but also in other combinations, or individually, without departing from the scope of the disclosure. In the drawings:

DETAILED DESCRIPTION

Figure 1:
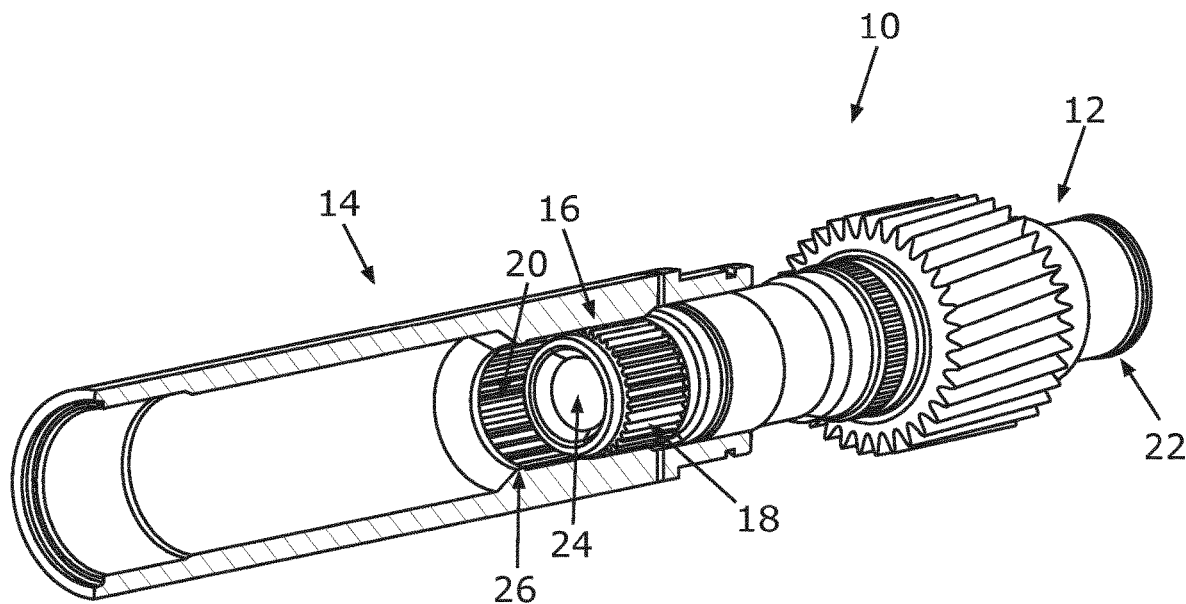
FIG. 1 shows a perspective view of a hollow-shaft arrangement for a motor vehicle, which has an inner hollow shaft in the form of a transmission input shaft and has an outer hollow shaft in the form of a rotor shaft of an electric machine, wherein the outer hollow shaft is illustrated partially in section.

In the figures, identical and functionally identical elements are denoted by the same reference signs. A hollow-shaft arrangement 10 for a motor vehicle is shown in a perspective view in FIG. 1. The hollow-shaft arrangement 10 comprises an inner hollow shaft in the form of a transmission input shaft 12 and an outer hollow shaft in the form of a rotor shaft 14, which are connected to one another by means of a spline toothing 16. The spline toothing 16 is formed by an outer toothing 18 of the transmission input shaft 12 and by an inner toothing 20 of the rotor shaft 14, which engage with one another in a rotationally conjoint manner.

The transmission input shaft 12 has an inflow end 22 for feeding of a fluid into the interior of the transmission input shaft 12 and has an outflow end 24 which opens out, within the inner toothing 20 of the rotor shaft 14, into the latter. As viewed from the inflow end 22 of the transmission input shaft 12, an inner shaft shoulder 26 of the rotor shaft 14 is arranged behind the inner toothing 20 in an axial direction. Here, an inner diameter of said shaft shoulder 26 is smaller than a root-circle diameter of the inner toothing 20. In other words, the inner shaft shoulder 26 projects radially inward further than a root circle of the inner toothing 20.

Figure 2:
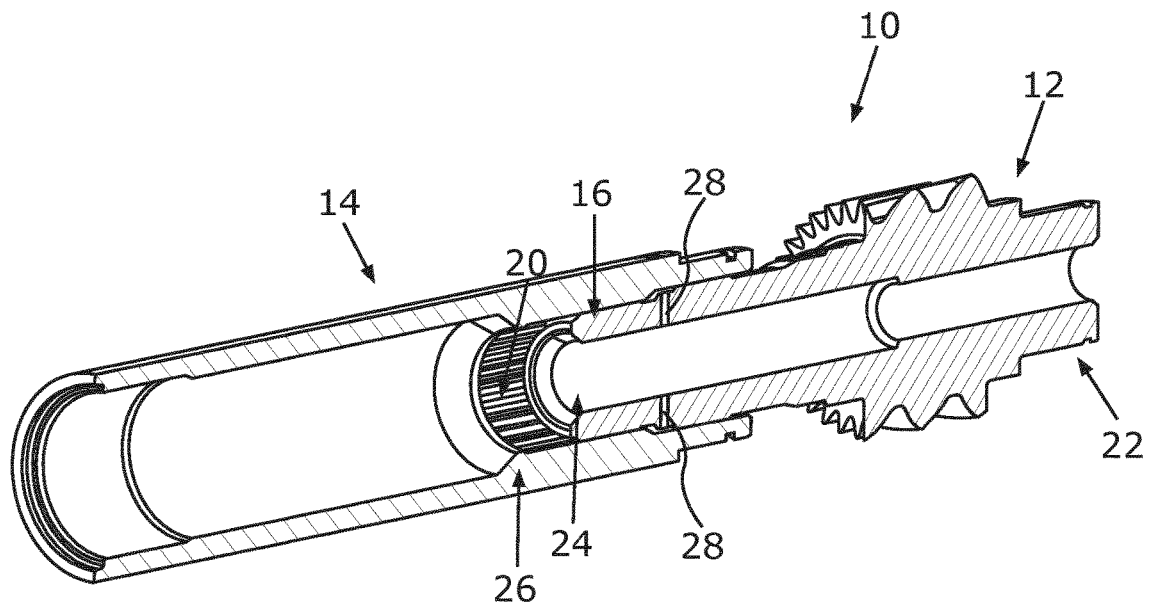
FIG. 2 shows a perspective view, partially in section, of the hollow-shaft arrangement, wherein both the inner hollow shaft and the outer hollow shaft are illustrated partially in section.

The hollow-shaft arrangement 10 is shown in a further perspective view in FIG. 2, wherein both hollow shafts 12, 14 are illustrated partially in section. In the present illustration, two radially extending passage openings 28 of the transmission input shaft 12 can be seen. A part of the fluid introduced at the inflow end 22 can exit the transmission input shaft 12 radially outward through said passage openings 28. The remaining part of the fluid flows onward axially to the outflow end 24.

From there, the fluid passes, due to centrifugal-force action, since the hollow-shaft arrangement 10 rotates during intended operation, radially to to the inner toothing 20, specifically to that part of the inner toothing 20 which is not in engagement with the outer toothing 18 of the transmission input shaft 12. From there, the fluid flows axially as far as the shaft shoulder 26 and is backed up by the latter. The fluid is thus backed up by the shaft shoulder 26, which projects radially inward further than a root circle of the inner toothing 20, in the root region of the inner toothing 20 and is consequently directed back in the direction of the inflow end 22, specifically such that at least a part of the fluid flows through the spline toothing 16 and in this way lubricates the latter.

Figure 3:
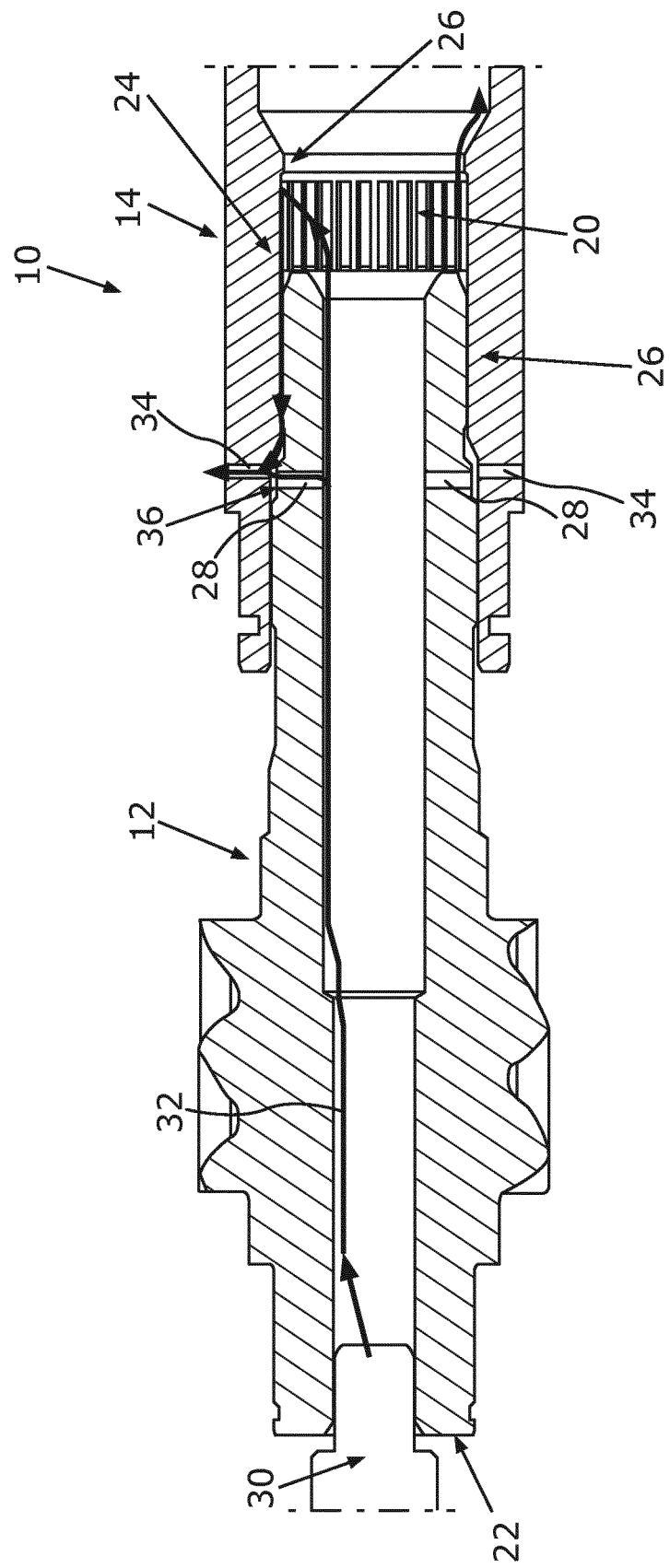
FIG. 3 shows a sectional side view of a part of the hollow-shaft arrangement.

A part of the hollow-shaft arrangement 10 is shown in a sectional side view in FIG. 3. In the region of the inflow end 22 of the transmission input shaft 12, there is arranged a fluid feed 30, which transports the fluid into the interior of the transmission input shaft 12 obliquely to the longitudinal direction or axial direction of the transmission input shaft 12. The fluid feed 30 may have for example one or else multiple nozzles, which may be oriented obliquely to the longitudinal direction or to the axial direction of the transmission input shaft 12.

A fluid flow 32 is schematically indicated in the present case so as to show how the fluid introduced flows through the interior of the transmission input shaft 12, partially exits radially outward through the passage openings 28, and then flows onward as far as the outflow end 24. During the operation of the hollow-shaft arrangement 10, the transmission input shaft 12 and the rotor shaft 14 rotate. By way of this rotational movement, the fluid passes, due to centrifugal-force action, radially outward after it has passed the outflow end 24 of the transmission input shaft 12.

The inner toothing 20 of the rotor shaft 14 axially projects beyond the outer toothing 18 (not visible here) of the transmission input shaft 12 to such an extent in the direction of the shaft shoulder 26 that, when the two hollow shafts 12, 14 rotate, at least a part of the fluid exiting from the outflow end 24 of the transmission input shaft 12 passes, due to centrifugal-force action, to the inner toothing 20 of the rotor shaft 14 that is not in engagement with the outer toothing 18. The fluid thus flows internally within the rotor shaft 14 firstly along the outer toothing 18 at least substantially in an axial direction, specifically until the fluid has flowed as far as the shaft shoulder 26.

The shaft shoulder 26 projects radially inward further than a root circle of the outer toothing 18. Consequently, the fluid is backed up by the shaft shoulder 26 and flows in reverse, that is to say to the left in the present illustration, through the spline toothing 16. This results in centrifugal-force-driven counterflow lubrication of the spline toothing 16. As soon as the teeth or tooth interspaces of the outer toothing 20 have been completely filled by the fluid, the fluid runs radially inward over the shaft shoulder 26 and in this way passes further into the interior of the rotor shaft 14, that is to say flows away to the right in the present illustration.

Behind the spline toothing 16 as viewed from the shaft shoulder 26, the rotor shaft 14 has multiple radially extending passage openings 34 through which that portion of the fluid which flows back through the spline toothing 16 can exit the rotor shaft 14 outward, so as, in this way, to lubricate and/or to cool surrounding components. The passage openings 28, 34 of the two hollow shafts 12, 14 are connected to one another via an intermediate space 36 formed between the two hollow shafts 12, 14. The fluid exiting through the passage openings 28 thus passes into the intermediate space 36, as does likewise the flowing-back part of the fluid which has passed the spline toothing 16 beforehand. From the intermediate space 36, both fluid flows then together pass radially outward through the passage openings 34 and thereby exit the rotor shaft 14.

Figure 4:
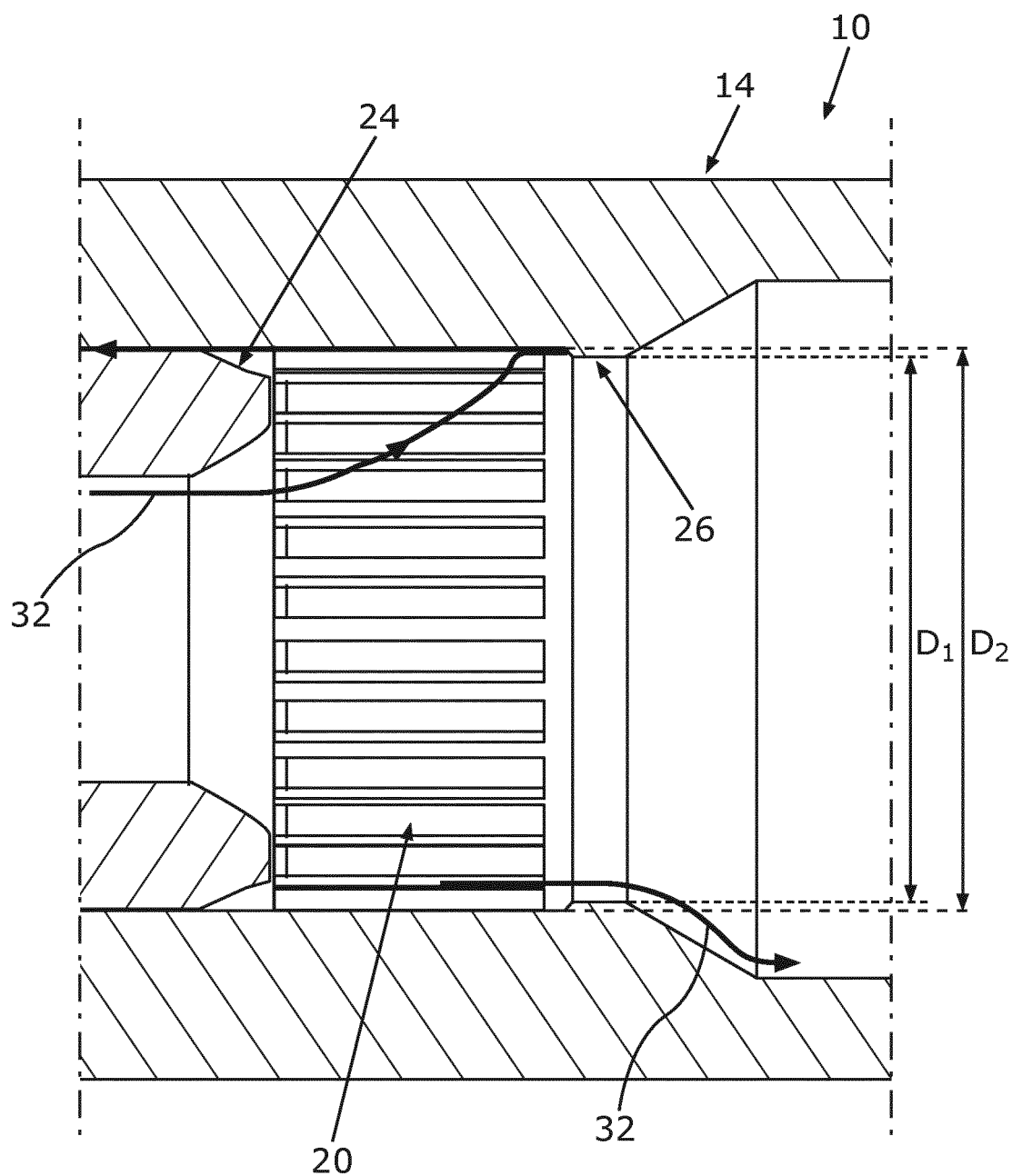
FIG. 4 shows a greatly enlarged sectional side view of the hollow-shaft arrangement in the region of a spline toothing, by way of which the two hollow shafts are connected to one another in a rotationally conjoint manner.

FIG. 4 shows a region around the shaft shoulder 26 of the hollow-shaft arrangement 10 in a greatly enlarged sectional side view. In the present case, the already mentioned inner diameter $D_1$ of the shaft shoulder 26 is shown, wherein moreover the already mentioned root-circle diameter $D_2$ of the inner toothing 20 is also shown. The shaft shoulder 26 may, in a radial direction, for example project inward to such an extent that the inner diameter $D_1$ is not only smaller than the root-circle diameter $D_2$, but for example also may be smaller than a pitch-circle diameter or tip-circle diameter (not illustrated here) of the inner toothing 20.

Thus, in a radial direction, the shaft shoulder 26 may project inward to such an extent that, as seen in the radial direction, said shaft shoulder for example projects into the interior of the rotor shaft 14 to the same extent as the respective teeth (not denoted in any more detail here) of the inner toothing 20. In this case, the shaft shoulder 26 can make provision for the fluid to be backed up over the entire tooth height of the inner toothing 20 due to the shaft shoulder 26 and to centrifugal-force action. The fluid accumulates in particular in the tooth root region and then flows, in relation to an axial main flow direction, according to which the fluid flows through the transmission input shaft 12, in reverse or in a reactive manner, as a consequence of which the spline toothing 16 is lubricated. As soon as the fluid has been backed up beyond the height of the inner shaft shoulder 26 as viewed in a radial direction, further fluid runs over the shaft shoulder 26 and in this way passes further to the right according to the present illustration, into the interior of the rotor shaft 14.

The above explanations apply not only to a hollow-shaft arrangement 10 in which the inner hollow shaft is a transmission input shaft 12 and the outer hollow shaft is a rotor shaft 14, but for any types of hollow-shaft arrangements in which a fluid firstly is introduced into the interior of such a hollow shaft 12, from there flows in the direction of the outer hollow shaft 14, and then, by way of a shaft shoulder 26 of said type, is at least partially diverted so as to flow in reverse in such a way that the respective spline toothing 16 undergoes lubrication.

LIST OF REFERENCE SIGNS

10 Hollow-shaft arrangement
12 Inner hollow shaft in the form of a transmission input shaft
14 Outer hollow shaft in the form of a rotor shaft
16 Spline toothing
18 Outer toothing
20 Inner toothing
22 Inflow end
24 Outflow end
26 Shaft shoulder
28 Passage openings of the transmission input shaft
30 Fluid feed
32 Fluid flow
34 Passage openings of the rotor shaft
36 Intermediate space
$D_1$ Inner diameter of the shaft shoulder
$D_2$ Root-circle diameter of the inner toothing

The invention claimed is:

1. A hollow-shaft arrangement for a motor vehicle, comprising:
an inner hollow shaft; and
an outer hollow shaft, the inner hollow shaft and the outer hollow shaft being connected to one another with spline toothing, wherein
an outer toothing of the inner hollow shaft engages with an inner toothing of the outer hollow shaft in a rotationally conjoint manner,
the inner hollow shaft has an inflow end configured to feed a fluid into the interior of the inner hollow shaft and has an outflow end which opens out, within the inner toothing, into the outer hollow shaft, and
an inner shaft shoulder of the outer hollow shaft is arranged behind the inner toothing in an axial direction as viewed from the inflow end of the inner hollow shaft, the inner diameter ($D_1$) of which shaft shoulder is smaller than a root-circle diameter ($D_2$) of the inner toothing, so that, when the hollow shafts rotate, the fluid exiting from the outflow end of the inner hollow shaft at least partially is backed up by the shaft shoulder in a tooth root region of the inner toothing and flows back in the direction of the inflow end of the inner hollow shaft within the splice toothing, and an inner diameter of the outer hollow shaft behind the shaft shoulder as viewed from the inner toothing is larger than $D_2$.

2. The hollow-shaft arrangement according to claim 1, wherein
the inner toothing of the outer hollow shaft axially projects beyond the outer toothing of the inner hollow shaft to such an extent in the direction of the shaft shoulder that, when the two hollow shafts rotate, at least a part of the fluid exiting from the outflow end of the inner hollow shaft passes, due to centrifugal-force action, to the inner toothing of the outer hollow shaft that is not in engagement with the outer toothing.

3. The hollow-shaft arrangement according to claim 2, wherein
behind the spline toothing as viewed from the shaft shoulder, the outer hollow shaft has at least one radially extending passage opening through which that portion of the fluid which flows back through the spline toothing can exit the outer hollow shaft.

4. The hollow-shaft arrangement according to claim 3, wherein
the inner hollow shaft has at least one radially extending passage opening through which a part of the fluid fed through the inflow end can exit the inner hollow shaft.

5. The hollow-shaft arrangement according to claim 4, wherein
the passage openings of the hollow shafts are connected to one another via an intermediate space formed between the hollow shafts.

6. The hollow-shaft arrangement according to claim 5, wherein
a fluid feed arranged in the region of the inflow end of the inner hollow shaft introduces the fluid obliquely to the longitudinal direction of the inner hollow shaft.

7. The hollow-shaft arrangement according to claim 6, wherein
the fluid feed has at least one nozzle which is oriented obliquely to the longitudinal direction of the inner hollow shaft.

8. The hollow-shaft arrangement according to claim 7, wherein
the inner hollow shaft is a transmission input shaft, and the outer hollow shaft is a rotor shaft of an electric drive machine.

9. A motor vehicle comprising:
at least one hollow-shaft arrangement according to claim 8.

* * * * *